Patented Dec. 25, 1951

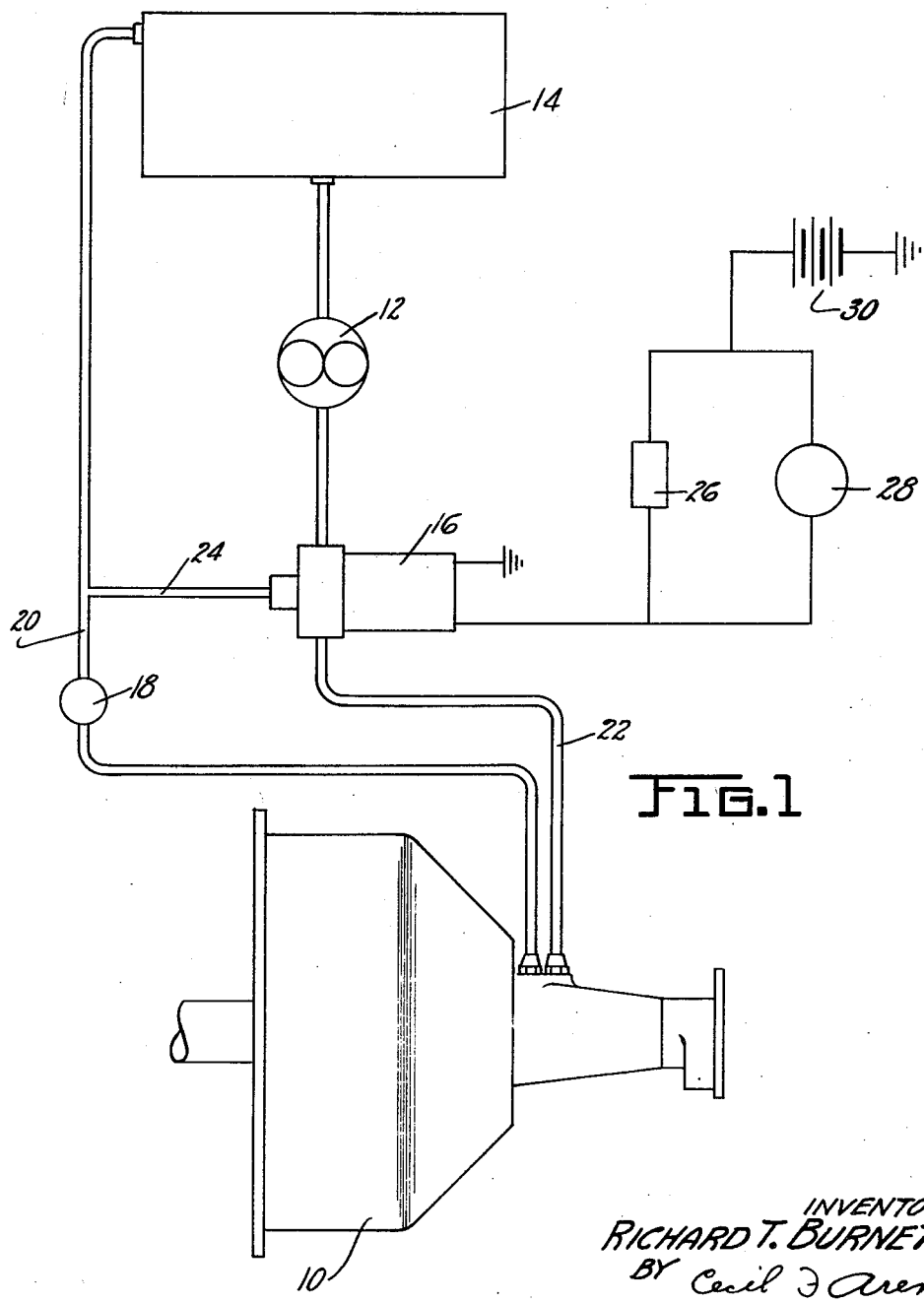

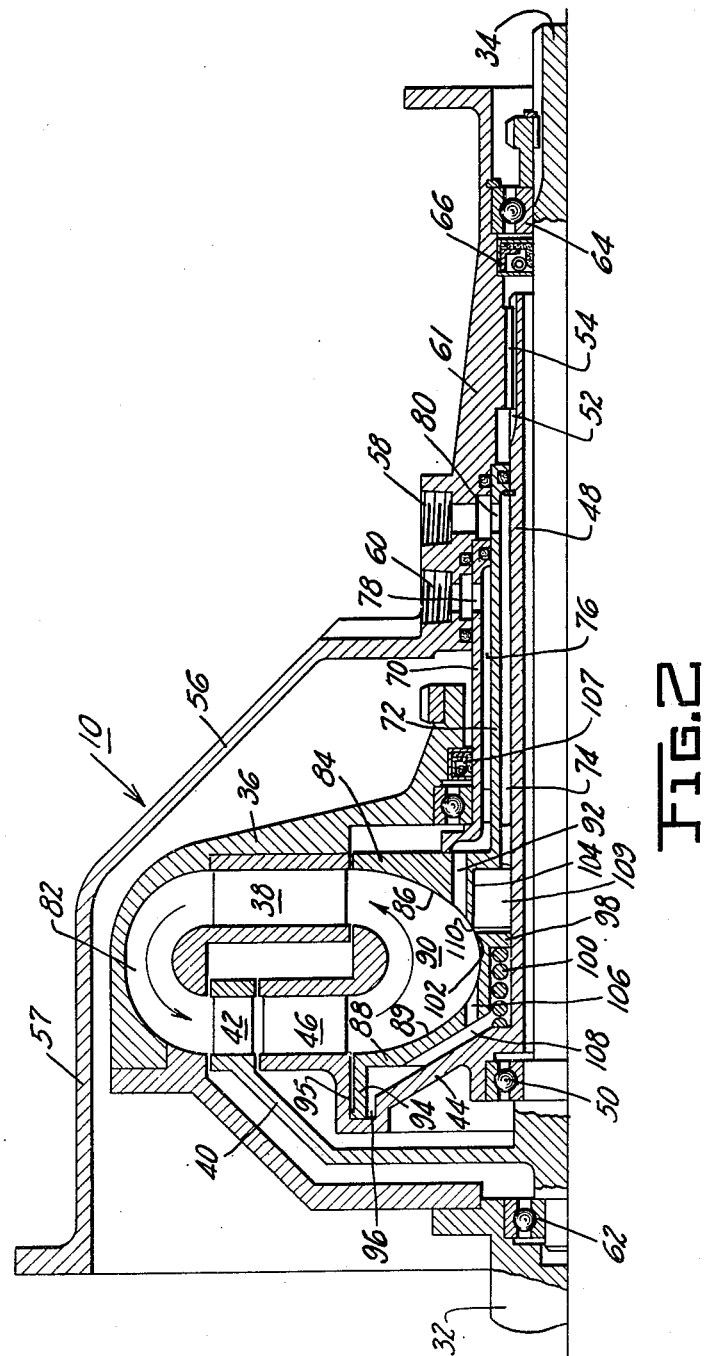

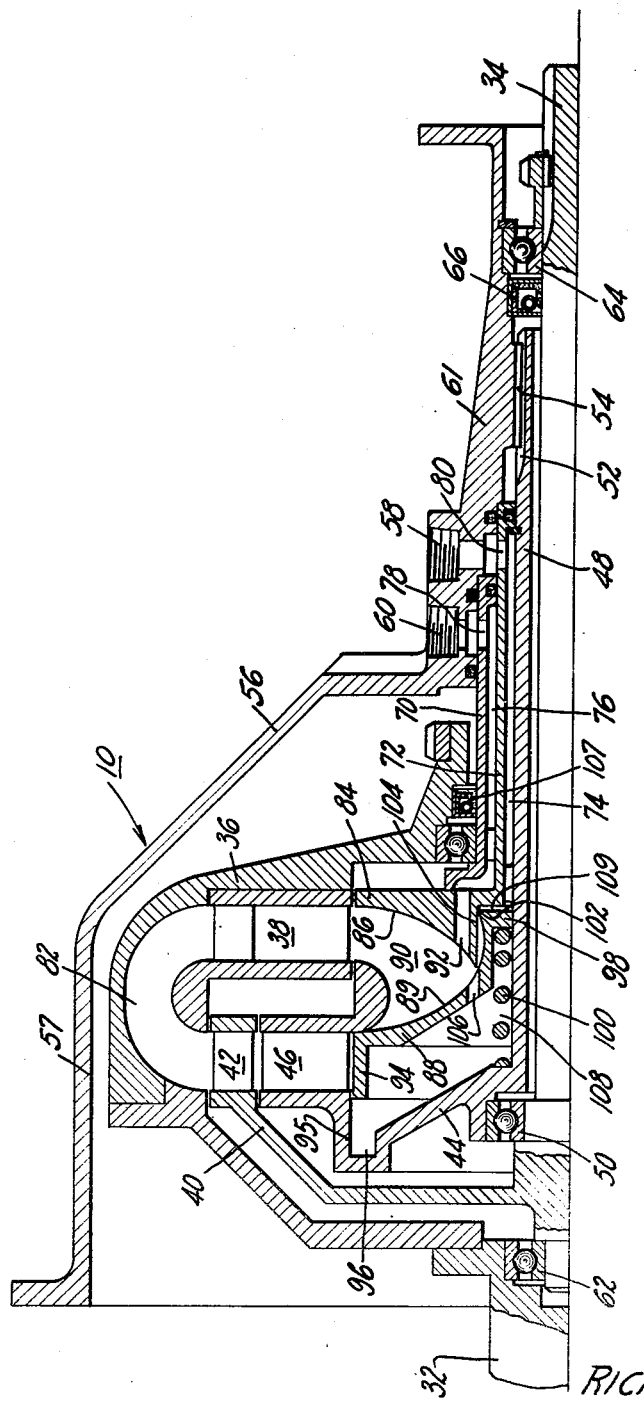

2,580,072

UNITED STATES PATENT OFFICE 2,580,072

ROTARY HYDRAULIC TORQUE CONVERTER

Richard T. Burnett, South Bend, Ind., assignor to Bendix Aviation Corporation, South Bend, Ind., a corporation of Delaware Application May 2, 1947, Serial No. 745,463

9 Claims. (Cl. 60—54)

This invention relates to infinitely variable transmissions, and more particularly to an improved means of interrupting flow in a hydrokinetic torque converter which is drivably connected to such a transmission.

It is a primary object of this invention to provide a device to be used with a fluid drive for a vehicle which will eliminate drag between the rotating parts of the drive during idling speeds, to thereby facilitate shifting gears and to prevent creeping of the vehicle.

It is an object of the invention to provide a ring valve which automatically controls flow in the closed fluid circuit or vortex chamber of a torque converter.

Another object of the invention resides in the provision of a valve for controlling flow in the closed circuit of a torque converter, which valve responds to static pressure of a hydraulic system to which the converter is connected and to the dynamic force of the circulating fluid contained in the closed circuit.

It is a further object of the invention to provide a ring valve for controlling flow in the fluid circuit of a torque converter, which valve is initially opened by static pressure and held open by the dynamic pressure of the circulating fluid.

A very important object of the invention resides in the provision of a valve in the fluid circuit of a torque converter, which valve forms a portion of the fluid circuit.

A still more important object of the invention resides in the provision of a valve in the fluid circuit of a torque converter, the position of the valve being controlled by throttle position and governor on out-put shaft.

The above and other objects and features of the invention will be apparent from the following description of the apparatus taken in connection with the accompanying drawings which form a part of this specification, and in which:

Figure 1 is a diagrammatic representation of the device of the invention associated with a torque converter and hydraulic system therefor;

Figure 2 is a view in longitudinal section of a torque converter incorporating my improved valve construction; and Figure 3 is a fragmentary sectional view of a torque converter with the valve in closed position.

Referring to Figure 1 of the drawings the numeral 10 designates a torque converter connected to an external hydraulic system comprising a pump 12, which receives fluid from a reservoir 14, a solenoid valve 16, and a relief valve 18 located in a return conduit 20. A supply conduit 22 carries fluid from the pump to the torque converter when the solenoid valve is energized and a by-pass conduit 24 circulates fluid back to the reservoir through the return conduit when the solenoid valve is de-energized. Construction of the valve is such that when it is de-energized, fluid flow is cut off to conduit 22 and by-passed through conduit 24 to reservoir. To control energization of the solenoid valve a circuit is provided therefor in which a throttle switch 26 and governor switch 28 are connected in parallel. A source 30 supplies current to the solenoid valve through the switches. The throttle switch is normally open but closed when the throttle is opened. To obviate deenergizing the solenoid valve every time the throttle is released and thereby cutting off fluid under pressure to the torque converter, a governor is provided, not shown, which responds to a predetermined output shaft speed to actuate the switch 28 to energize the solenoid valve to open it to maintain the supply of fluid to the converter when output shaft speed is above the predetermined speed.

Figure 2 illustrates the hydro-kinetic torque converter 10 into which my improved valve has been incorporated. The torque converter includes a driving shaft 32, driven shaft 34, and impeller wheel 36 having blades 38 secured thereto. The impeller wheel 36 is in the form of a housing suitably secured to the driving shaft 32 in any desired manner to be rotated thereby. A turbine wheel 40, having blades or vanes 42 is suitably secured to the driven shaft 34 to rotate the same. A guide or reaction wheel 44 is equipped with blades or vanes 46 and is disposed within the housing formed by the impeller wheel. The guide wheel 44 is supported by a sleeve 48 encircling the driven shaft. The sleeve has one end carried by a bearing 50 interposed between the sleeve and driven shaft and the other end of the sleeve is splined at 52 to slidably engage the spline 54 of a casing or housing 56 which is expanded at 57 to form a cover for the converter. Inlet and outlet ports 58 and 60 are formed in a reduced section 61 of the casing 56. The driven shaft, to which the turbine wheel is suitably fixed, is supported at one end by a bearing 62 disposed in one end of the driving shaft, and at the other end by a bearing 64 carried by the reduced section of the casing 56. A seal 66 is located in the reduced section 61 adjacent the bearing 64 and wipes the surface of the driven shaft 34. A seal 107 is located in impeller housing 36 and wipes surface of fixed sleeve 70.

Tubular members 70 and 72 are concentrically related to sleeve 48 and radially spaced apart therefrom to provide passages 74 and 76 connecting the torque converter to the inlet and outlet ports respectively. The tubular members 70 and 72 have openings 78 and 80 respectively which connect the outlet and inlet ports with passages 76 and 74.

The rotatable bladed impeller and turbine wheels together with the stationary bladed guide wheel form a portion of an annular fluid circuit or vortex chamber in the torque converter. As indicated by the arrows, flow is radially outward through the impeller and radially inward through the turbine and guide wheels. The extreme outer portion of the closed fluid circuit is formed from the impeller wheel which is properly configured to provide a circular channel 82 of concave cross-section. The intermediate portion of the closed circuit is formed in part by the turbine and guide wheels. The inner portion of the closed circuit is formed in part by a member 84 integral with the tubular member 72, and having an inner concave surface 86, and in part by a concave axially slidable ring valve member 88 which also forms part of the wall. The two members 84 and 88 together provide a channel 90 of concave cross-section. Member 84 is bored at 92 to provide an outlet opening from the vortex chamber to the passage 76 and thence to the outlet port 60.

The ring valve member 88 is formed with a curved inner wall 89 and is further provided with flange 94 which slidably contacts a cylindrical surface 95 of an axially extending circular groove 96 of the guide wheel. The ring valve is further provided with a second flange 98 which slides on the sleeve 48. A spring 100 encircles the sleeve 48 so that one end of the spring abuts the integral guide wheel 44 and the other end of the spring, that is, the free end of the spring engages one side of the flange 98 of the valve member 88 to normally urge the same toward closed position, see Figure 3. The concave portion of the wall or valve member 88 is machined at 102 to slide along a recessed portion 104 of the wall member 84, thus providing a sliding valve fit. In the closed position of the valve 88 the flange 94 cuts off the circulation of fluid in the vortex chamber or closed fluid circuit. The valve member is drilled at 106 to communicate the back side of the valve member with the closed circuit to thereby balance the static fluid pressure acting thereon when the valve is open, and to provide a passage for the fluid into and out of chamber 108 when valve is closed or opened.

The recessed portion 104 of member 84 provides a cavity 109 into which the ring valve slides when axially displaced to the right by the spring 100. Axial displacement of the ring valve to the right, as best shown in Figure 3, closes an inlet passage 110 to thereby cut off communication between the cavity 109 and the vortex chamber. The flange 98 of the ring valve forms a movable wall for the cavity 109 into which fluid under pressure is admitted from the pump 12 through the passage 74.

*Operation of the valve is as follows*

With the solenoid valve de-energized, fluid is freely circulated by the pump 12 through by-pass conduit 24 and return conduit 20 to the reservoir 14. At this time the flange 94 of the valve blocks the circulation of fluid in the closed fluid circuit of the converter. The force on the turbine blades is zero when fluid is not circulating through the circuit. Closing the normally open throttle switch 26 energizes the solenoid valve to open the same to admit fluid under pressure to the torque converter. This fluid under static pressure acts on the vertical face of the circular flange 98 to urge the valve to the left against the force of spring 100 to thereby communicate the cavity 109 with the vortex chamber through the inlet passage 110.

As the valve member 88 moves to open the inlet passage 110, the flange 94, which normally blocks the circulation of fluid in the vortex chamber moves out of the circuit and circulation is established. This circulation creates a dynamic force against wall 89 which varies with the velocity of the fluid circulation and with impeller speed. If impeller speed is low, the force of spring 100 must be counteracted by pressure against the annular area of flange 98. This pressure is maintained in cavity 109 by the pressure drop thru the inlet opening 110, which opening is relatively small at this time. As the impeller speed is increased the dynamic force increases until it becomes greater than that of the spring 100. This causes a further movement of the valve 88 to the left which widens the inlet opening 110 so that the pressure drop therethrough is quite small, thus lowering the pressure the circulating pump 12 must provide. The circulating pump also pressurizes the fluid in the torque converter to thereby minimize bubbling and cavitation which are detrimental to optimum efficiency. The escape of fluid through passage 92 carries air bubbles to the outlet port 60. Above a predetermined impeller speed the dynamic force of the circulating fluid in the vortex chamber will hold the valve open against the spring. Below the predetermined impeller speed the spring will cause the valve to close if it is not opposed by fluid under pressure from the positive displacement pump.

Above a predetermined output shaft speed the governor switch will remain closed to keep the solenoid valve 16 energized, regardless of the release, and subsequent opening of the throttle switch. This action insures the pressurization and circulation of fluid in the circuit at all times above a given output shaft speed, below which the solenoid valve is de-energized if the throttle is also released. When the speed of the driving shaft drops below a predetermined valve the dynamic force of the circulating fluid is no longer sufficient to hold the ring valve open against the spring 100. At this time the ring valve is urged toward open position, that is, in a direction to prevent blocking the fluid circuit, see Figure 2, only by the static pressure of the system acting on the vertical surface of flange 98. With the throttle closed, switch 26 is open, and the speed of the driven shaft below a predetermined value the solenoid valve will be de-energized to thereby permit this valve to close to cut off fluid under pressure to the torque converter. With the solenoid valve closed the static pressure acting on the ring valve drops to zero, whereby the ring valve closes under the influence of spring 100.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A hydro-kinetic torque converter comprising rotatable bladed impeller and turbine wheels and a bladed guide wheel, a driving shaft for the impeller wheel, a driven shaft mounting the turbine wheel, said wheels so constructed and arranged that together they provide a portion of a vortex chamber through which fluid is circulated by the impeller wheel to tend to cause rotation of the turbine wheel, said guide wheel being formed with an axially extending circular groove in its face and an integral sleeve disposed coaxially with the driven shaft and spaced apart therefrom, a valve member constituted to provide a portion of the vortex chamber and shiftable axially along said sleeve to control vortical circulation, said valve member constituted to have two flanges, one of which is engageable with and slidable in the circular groove, the other of which is disposed in bearing relationship to the sleeve, and a spring interposed between the guide wheel and said other flange normally urging the valve member in a direction tending to cut off vortical circulation, a source of fluid under pressure, said valve member being subjected to said fluid under pressure urging the same against said spring to establish circulation in the vortex chamber, after which time the valve member is subjected to the dynamic pressure of the circulating fluid to hold said valve member open.

2. A fluid drive device including a driving shaft and a driven shaft, a rotatable bladed impeller wheel mounted on the driving shaft for rotation therewith, a rotatable bladed turbine wheel secured to the driven shaft for rotation therewith, said wheels so constructed and arranged that together they provide a portion of a vortex chamber through which fluid is circulated by the impeller wheel to tend to impart rotation to the turbine wheel, inlet and outlet openings in communication with said vortex chamber, a valve member constituted to provide a portion of the vortex chamber and spring biased to close the inlet to said vortex chamber and also block vortical circulation of fluid therein, a source of fluid under pressure, said valve member constructed and arranged to respond to said fluid under pressure from said source to thereby shift said valve member to open the inlet and also permit vortical circulation of fluid, said valve member being acted upon by the dynamic force of the fluid caused by the vortical circulation tending to hold the valve member in open position.

3. A hydro-kinetic torque converter comprising a source of fluid under pressure, rotatable bladed impeller and turbine wheels, and a bladed guide wheel, means including said wheels for providing a vortex chamber through which fluid is circulated by the impeller wheel to tend to cause rotation of the turbine wheel, inlet and outlet openings in communication with the vortex chamber, said means also including a mechanism which blocks the vortical circulation of fluid and at the same time closes the inlet opening, said mechanism being shiftable from said blocking position to an open position in response to said source of fluid under pressure to thereby permit vortical circulation of fluid and also open the inlet passage, whereupon the dynamic force of the circulating fluid acts upon said mechanism to tend to maintain said mechanism in open position.

4. A hydro-kinetic torque converter comprising a source of fluid under pressure, rotatable bladed impeller and turbine wheels and a bladed guide wheel, a driving shaft for the impeller wheel, a driven shaft mounting the turbine wheel, said wheels so constructed and arranged that they provide portions of an annular fluid circuit through which fluid is circulated by the impeller wheel to tend to cause rotation of the turbine wheel, a valve member constituted to form another portion of the annular fluid circuit and shiftable axially along the axis of rotation of said wheel for controlling vortical circulation, and a spring interposed between the guide wheel and valve member urging the latter in a direction tending to close the annular fluid circuit to cut off vortical circulation, said valve member constituted to respond to fluid under pressure to initially move said valve member in a direction to open the annular fluid circuit to permit vortical circulation and then to respond to the dynamic pressure of the circulating fluid to hold said valve member open.

5. The combination with a fluid drive mechanism having means providing a vortex chamber and including a rotatable bladed impeller wheel and a bladed turbine wheel so arranged that fluid circulated in the vortex chamber by the impeller wheel tends to impart rotation to the turbine wheel, of a fluid system comprising a reservoir for fluid interconnected with said vortex chamber to provide an outlet therefor, a pump having an inlet connected to the reservoir and an outlet interconnected with the reservoir and the fluid drive mechanism, a valve in the system interposed between the pump outlet and reservoir on the one hand and the pump outlet and fluid drive mechanism on the other hand, said valve constituted to have a first position in which it communicates the reservoir with the pump outlet and cuts off communication between the latter and the fluid drive mechanism and a second position in which communication is cut off between the reservoir and pump outlet and established between the latter and the fluid drive mechanism, and means for actuating said valve for causing the same to be moved from its first position to its second position, said first named means comprising a normally closed ring valve constructed and arranged to respond to the fluid under pressure from said pump for controlling the admission of fluid from said pump to said vortex chamber and also the vortical circulation of fluid in said vortex chamber, whereby rotation of said turbine wheel is controlled.

6. The combination with a fluid drive mechanism having means providing a vortex chamber and including a rotatable bladed impeller wheel and a bladed turbine wheel so arranged that fluid circulated in the vortex chamber by the impeller wheel tends to impart rotation to the turbine wheel, of a fluid system comprising a reservoir for fluid interconnected with said vortex chamber to provide an outlet therefor, a pump having an inlet connected to the reservoir and an outlet interconnected with the reservoir and the fluid drive mechanism, a valve in the system interposed between the pump outlet and reservoir on the one hand and the pump outlet and fluid drive mechanism on the other hand, said valve constituted to have a first position in which it communicates the reservoir with the pump outlet and cuts off communication between the latter and the fluid drive mechanism and a second position in which communication is cut off between the reservoir and the pump outlet and established between the latter and the fluid drive mechanism, means for actuating said valve for causing the valve to be moved from its first position to its second position, said first named means comprising a device movable in opposite directions in response to the fluid pressure from said pump and spring means respectively for controlling the vortical circulation of fluid, said device being held in a position of establishing circulation in said vortex chamber by the joint action of fluid under pressure from the pump and the dynamic pressure created by the circulating fluid, with said device being held in said last mentioned position by a pump pressure below the initial pressure required to move said device to said position.

7. The combination with a fluid drive mechanism having means providing a vortex chamber and including a rotatable blade impeller wheel and a bladed turbine wheel so arranged that fluid circulating in the vortex chamber by the the impeller wheel tends to impart rotation to the turbine wheel, of a fluid system comprising a reservoir for fluid interconnected with said vortex chamber, a pump having an inlet connected to the reservoir and an outlet interconnected with the reservoir and the fluid drive mechanism, a valve in the system interposed between the pump outlet and reservoir on the one hand and the pump outlet and fluid drive mechanism on the other hand, said valve constituted to have a first position in, which communication between the reservoir and the pump outlet is established and communication between the latter and the fluid drive mechanism is cut off and a second position in which the reverse is true, means including a throttle operated switch associated with the valve and having an inoperative position in which the valve remains in its first position and an operative position in which the valve is moved to its second position, means connectable to the turbine wheel and responsive to the speed thereof above a predetermined value for maintaining said valve in its second position irrespective of the position of said first mentioned means, whereby communication between the pump outlet and the vortex chamber is assured at all times above a predetermined speed of the turbine wheel, said first named means comprising a device responsive to the fluid under pressure from said pump for controlling the circulation of fluid in said vortex chamber.

8. A hydro-kinetic torque converter comprising rotatable bladed impeller and turbine wheels, and a bladed guide wheel, said wheels together forming part of a vortex chamber, means including a valve member forming the remainder of the vortex chamber, inlet and outlet openings in said means communicating with the vortex chamber, a source of fluid under pressure connected to said inlet opening, said valve member having first and second positions and constructed and arranged so that when the valve member is in its first position it closes the inlet opening to said fluid pressure source and blocks vortical flow, and in its second position it opens the inlet opening and permits vortical flow, and means for moving said valve member to its first position, said valve member movable to its second position under the influence of said fluid under pressure, whereby circulation from the inlet to the outlet via said vortical chamber is established.

9. A hydraulic torque converter comprising impeller, turbine, and guide wheels equipped with vanes and together defining part of a vortex chamber, said vortex chamber being connectible to a fluid pressure source, and means for completing said vortex chamber including a member movable under the influence of a spring into a blocking position in said chamber to interrupt vortical circulation, said member being subjected to pressure from said fluid source and movable against said spring, under the influence of said fluid pressure, into an unblocking position in said chamber to establish vortical circulation, said member now being acted upon by vortical circulation of fluid to abet the aforesaid fluid pressure in maintaining said member in the unblocking position.

RICHARD T. BURNETT.

REFERENCES CITED

The following references are of record in the file of this patent:

UNITED STATES PATENTS

| Number | Name | Date |
|---|---|---|
| 1,863,128 | Salerni | June 14, 1932 |
| 2,096,070 | Sinclair | Oct. 19, 1937 |
| 2,205,054 | Wemp | June 18, 1940 |
| 2,372,326 | Hewitt | Mar. 27, 1945 |
| 2,380,074 | Roche | July 10, 1945 |
| 2,384,841 | Lang et al. | Sept. 18, 1945 |